United States Patent [19]

Adams et al.

[11] Patent Number: 4,508,691

[45] Date of Patent: Apr. 2, 1985

[54] METHOD FOR TREATING EXHAUST GASES WITH AN IMPROVED CATALYST COMPOSITION

[75] Inventors: Karen M. Adams, Dearborn Heights; Haren S. Gandhi, Farmington Hills, both of Mich.

[73] Assignee: Ford Motor Company, Dearborn, Mich.

[21] Appl. No.: 408,546

[22] Filed: Aug. 16, 1982

Related U.S. Application Data

[63] Continuation of Ser. No. 284,759, Jul. 20, 1981, abandoned.

[51] Int. Cl.³ .............................................. B01D 53/36
[52] U.S. Cl. .................................. 423/213.5; 502/313
[58] Field of Search ..................... 423/213.5, 213.7; 252/470, 473, 474; 502/313

[56] References Cited

U.S. PATENT DOCUMENTS 4,171,287 10/1979 Keith ................................ 423/213.5
4,233,188 11/1980 Gandhi et al. ................... 423/213.5

*Primary Examiner*—Earl C. Thomas
*Assistant Examiner*—Jeffrey E. Russel
*Attorney, Agent, or Firm*—William E. Johnson; Olin B. Johnson

[57] ABSTRACT

There is disclosed a method of using an exhaust gas catalyst for treatment of exhaust gases developed by burning a hydrocarbon fuel or a fuel containing hydrocarbon and alcohol blends in an internal combustion engine. These exhaust gases contain varying amounts of unburned hydrocarbons, carbon monoxide and oxides of nitrogen depending upon the operating conditions of an internal combustion engine. This specification teaches a method of using an improved catalyst composition in which a support medium is provided for supporting the catalyst system. This support medium has deposited thereon palladium and finely divided tungsten. Tungsten is present on the support media in a quantity such that tungsten is available to substantially all of the palladium on the support medium. In this manner, the palladium/tungsten combination is effective in the catalytic oxidation of unburned hydrocarbons and carbon monoxide and the catalytic reduction of oxides of nitrogen without production of significant amounts of ammonia when the internal combustion engine is operating under fuel rich conditions.

14 Claims, 3 Drawing Figures

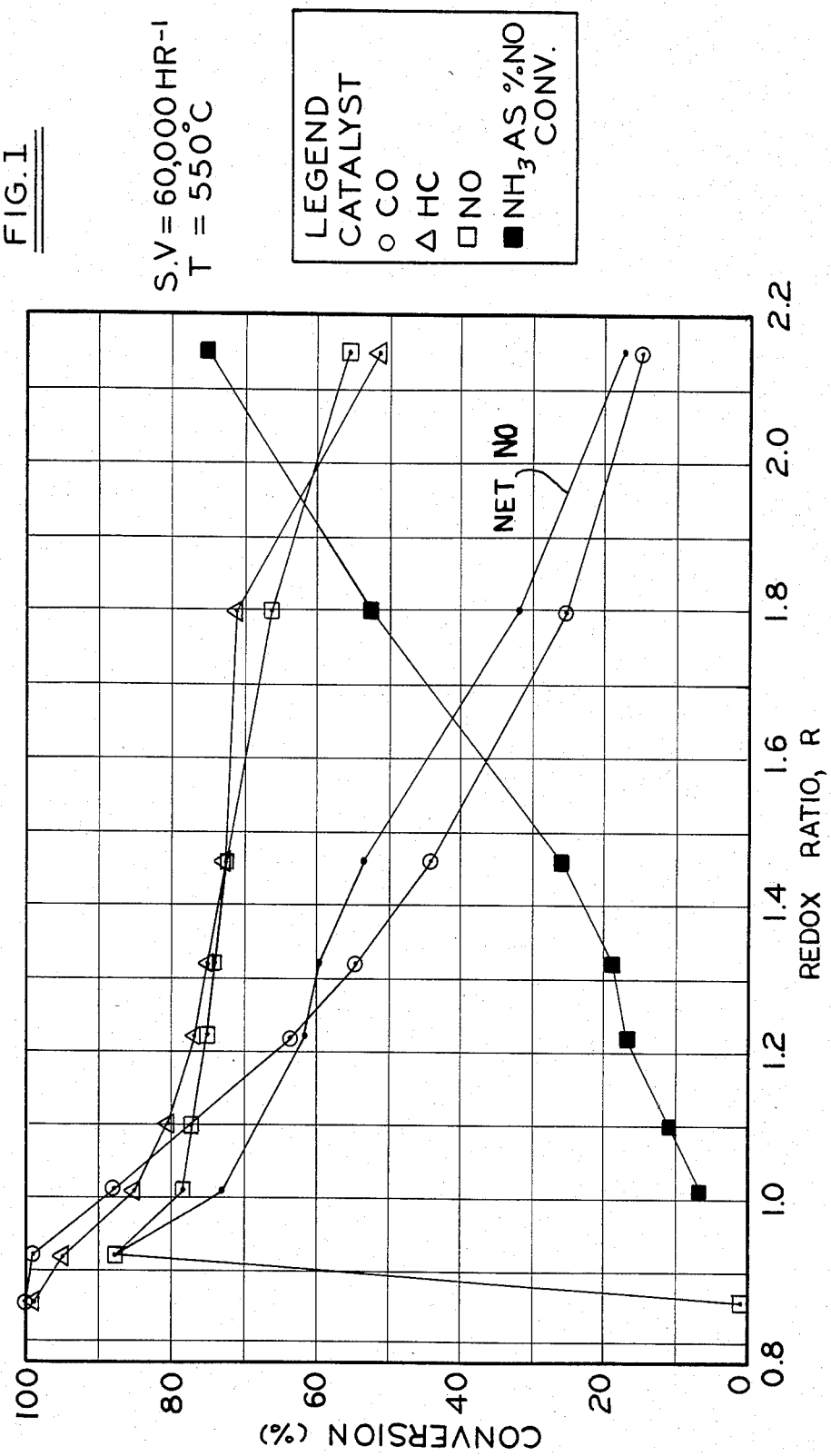

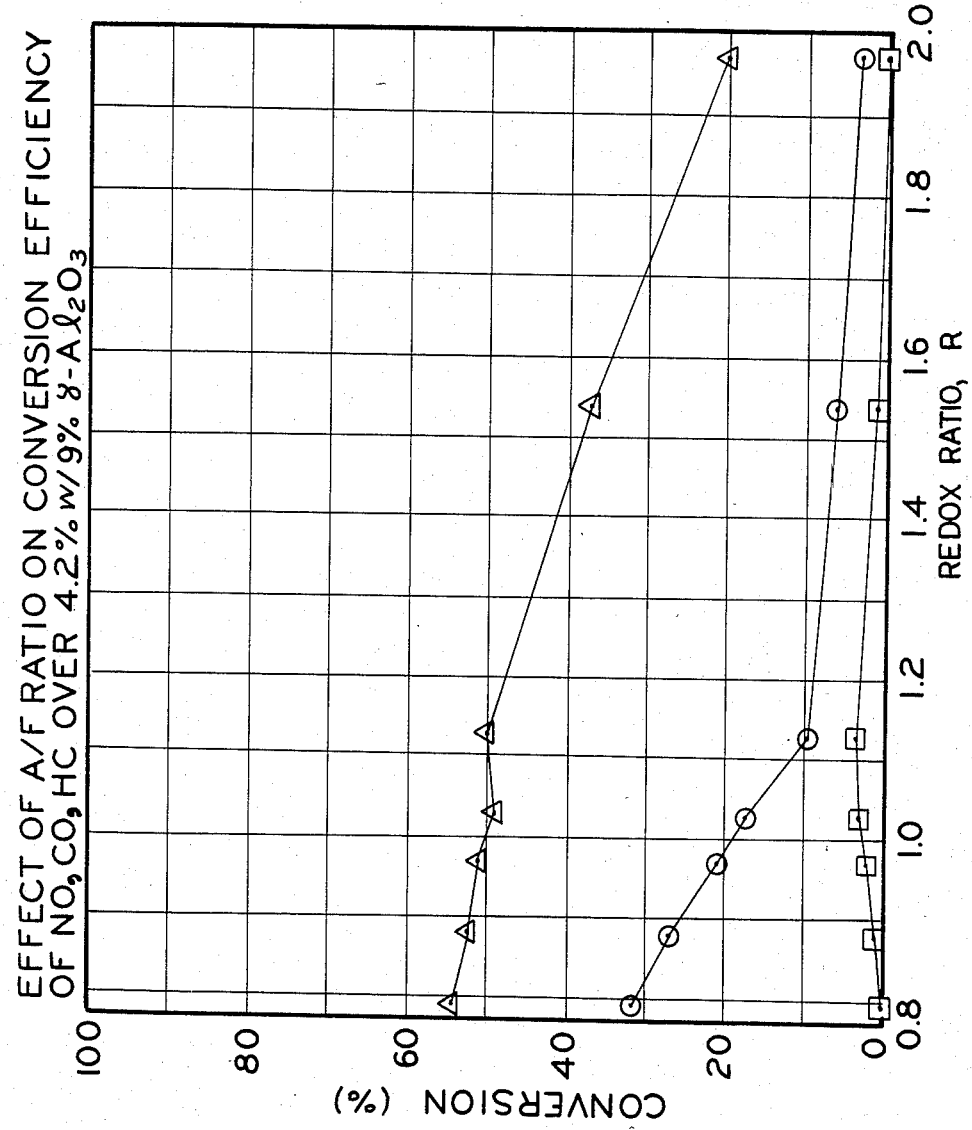

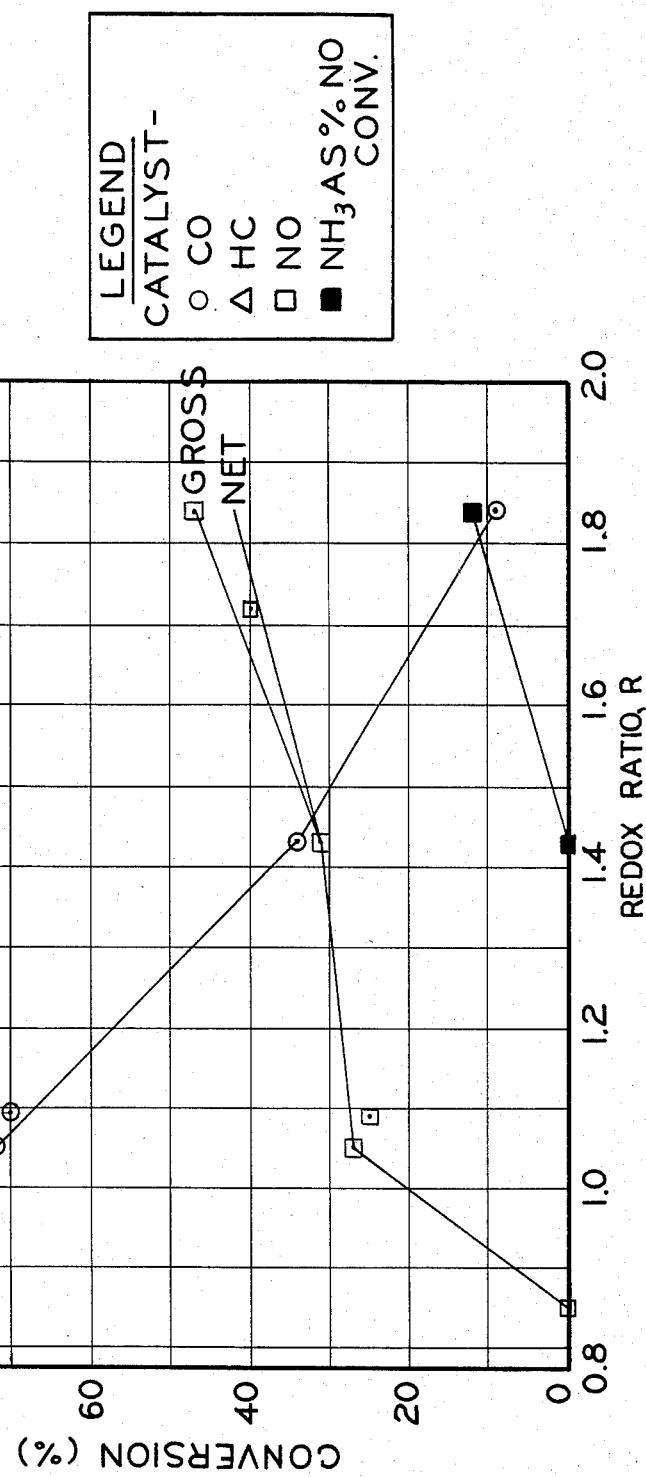

METHOD FOR TREATING EXHAUST GASES WITH AN IMPROVED CATALYST COMPOSITION

This is a continuation of application Ser. No. 284,759, filed July 20, 1981, and now abandoned.

BACKGROUND OF THE INVENTION AND PRIOR ART STATEMENT

No prior art search was conducted on the subject matter of this specification in the U.S. Patent Office or in any other search facility.

We are unaware of any prior art that is relevant to the catalyst system taught in this specification. The specific catalyst system taught is a palladium catalyst promoted by tungsten. The catalyst system has highly desirable characteristics in that it is effective in the catalytic oxidation of unburned hydrocarbons and the catalytic reduction of oxides of nitrogen without significant production of ammonia when an internal combustion engine with which it is associated is operated under fuel rich (oxygen deficient) conditions.

The disclosure of the present specification teaches a catalyst formation which we consider to be unique. This unique catalyst formation contains palladium and tungsten. The catalyst system finds utility in the simultaneous control of carbon monoxide, unburned hydrocarbons and oxides of nitrogen under engine operating conditions which are on the fuel rich side of stoichiometric. Palladium is a catalyst material which is considerably less expensive than platinum, which has been known in the past for uses such as the catalyst system disclosed herein. Tungsten, of course, is a base metal and is much less expensive than noble metals such as platinum and rhodium.

A principal object of the present invention is a method of using low cost catalyst system that is capable of treating an automotive exhaust produced by burning a rich fuel mixture in an automotive engine to simultaneously eliminate therefrom unburned hydrocarbons, carbon monoxide and oxides of nitrogen. It is a secondary object of this invention to provide a method of using low cost catalyst system that is capable of also treating automotive exhaust gases generated by burning a fuel lean mixture which will give high conversion rates for the oxidation of unburned hydrocarbons and carbon monoxide to carbon dioxide and water.

As is well known to a skilled artisan, an internal combustion engine normally associated with an automobile will generally operate on both sides of a stoichiometric air/fuel ratio during various modes of engine operation. For example, many engine systems are designed to operate slightly fuel deficient during normal cruising modes of the vehicle. At such time, there is more air present than is required to oxidize the fuel. Therefore, the overall operating mode of the system is oxidizing and the catalyst materials present are operating under oxidizing conditions. In other modes of engine operation, for example, during acceleration periods, internal combustion engines associated with automotive vehicles are normally operated on the rich side of stoichiometry. In this condition, there is more fuel present than air to oxidize the same. In such a case, the overall catalyst system is exposed to reducing conditions because there is not sufficient oxygen available over the catalyst system.

The method of using the catalyst system of the present invention is one which under oxidizing conditions is effective in the catalytic oxidation of unburned hydrocarbons and carbon monoxide, and under reducing conditions is effective not only in the catalytic oxidation of unburned hydrocarbons and carbon monoxide, but also in the catalytic reduction of oxides of nitrogen without significant production of ammonia. The method of using the catalyst system of this specification has these excellent characteristics even though it is using materials substantially less expensive than a material such as platinum, which was previously used for this type of catalyst system.

Another very significant advantage of the method of using the catalyst system of our invention is that the palladium and tungsten materials used are found in the United States. This lowers the dependency of the manufacture of catalyst systems on the availability of catalyst materials from foreign sources.

As mentioned above, platinum generally was the material used in order to achieve the catalytic control of certain materials in exhaust gases. However, platinum has some characteristics which are undesirable in such control systems which are not found with the palladium/tungsten system taught herein. In general, under fuel rich conditions, that is, when the catalyst system is exposed to reducing conditions, the platinum catalyst had good characteristics with respect to the oxidation of unburned hydrocarbons. However, the platinum catalyst does not have good selectivity in the reduction of oxides of nitrogen. By this we mean that the platinum catalyst produces a great amount of ammonia, rather than nitrogen gas, by the reduction of oxides of nitrogen.

The method of using the catalyst system of our invention does not have this side effect under reducing conditions of producing significant quantities of ammonia by the reduction of oxides of nitrogen.

SUMMARY OF THE INVENTION

This invention relates to the use of a palladium catalyst promoted by tungsten and, more particularly, to the use of such a catalyst for use as an exhaust gas catalyst for treatment of exhaust gases developed by burning a hydrocarbon fuel or fuels containing hydrocarbons and alcohol blends in an internal combustion engine.

In accordance with the teachings of this invention, an exhaust gas catalyst is provided for treatment of exhaust gases developed by burning a hydrocarbon fuel in an internal combustion engine. The exhaust gases contain various amounts of unburned hydrocarbons, carbon monoxide and oxides of nitrogen depending upon operating conditions of the internal combustion engine. The improved catalyst composition used in the exhaust gas treatment method is one which is deposited on a support medium and contained the following components. Finely divided tungsten is supported on the support media. Palladium is also deposited on the support media. In a sequential impregnation of these materials, it is necessary that the tungsten be deposited prior to the palladium so that the palladium is not covered up. The tungsten is present on the support medium in quantities such that tungsten is available to substantially all of the palladium on the support medium so that the platinum/tungsten combination is effective in the catalytic oxidation of unburned hydrocarbons and carbon monoxide and the catalytic reduction of oxides of nitrogen without significant production of ammonia when the internal combustion engine is operating under fuel rich conditions.

It is understood by those skilled in the art that other catalyst materials, materials for protecting the catalyst materials, and materials for promoting the catalyst materials may also be present on the support medium to carry out those functions already well known to the skilled artisan.

By way of instruction and not by way of a limitation to the scope of our invention, some particular details of a catalyst system falling within the scope of the method of our invention are set forth herein. The support medium for the catalyst system may be a monolithic substrate, or it may be a pelletized substrate, or even a metallic substrate. For example, if a monolithic substrate is selected, it may be washcoated with 5 to 25 weight percent of the catalyst substrate of gamma alumina. Thereafter, finely divided tungsten from 0.2 to 5 weight percent of the washcoated substrate and 0.02 to 1.0 weight percent of palladium by weight of the washcoated substrate can be applied to the washcoated substrate.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompany drawings, in which:

FIG. 1 is a graphical presentation of data on the effect of redox ratio on the conversion efficiency of oxides of nitrogen, carbon monoxide and hydrocarbons over a catalyst system containing 0.18% by weight palladium and 8% by weight gamma alumina;

FIG. 2 is a graphical presentation of data on the effect of redox ratio on the conversion efficiency of oxides of nitrogen, carbon monoxide and hydrocarbons over a catalyst system containing 4.2% by weight tungsten and 9% by weight gamma alumina; and FIG. 3 is a graphical presentation of data on the effect of redox ratio on conversion efficiency of oxides of nitrogen, carbon monoxide and hydrocarbons over a catalyst system containing 0.15% by weight palladium, 4.75% by weight tungsten and 9% by weight gamma alumina.

DESCRIPTION OF THE PREFERRED EMBODIMENT

In order to disclose the method of using the catalyst system of this invention, we desire to demonstrate the catalytic activity of three different catalyst system with respect to the effect of the redox ratio on the conversion efficiency of that catalyst system on oxides of nitrogen, carbon monoxide and unburned hydrocarbons. The three catalyst systems are demonstrated in FIGS. 1, 2 and 3. The first system is a palladium only catalyst, the second is a tungsten only catalyst, and the third is the combined palladium/tungsten catalyst system in accordance with our invention.

To illustrate the manufacture of the catalyst system used in our method, detailed instructions will be given for the manufacture of a catalyst system, namely, one containing both palladium and tungsten. The palladium only or tungsten only catalyst system may be manufactured using the same general procedures simply by leaving out the palladium or the tungsten component as illustrated when the combined system is made.

The preparation of a catalyst system is as follows. The resulting catalyst system will contain palladium, tungsten and gamma alumina. The preparation is initated by coating a cordierite honeycomb substrate (400 square cells/square inches, 6 mil wall thickness) as available from Corning Glass Company with a gamma alumina washcoat. After coating, with the gamma alumina, the substrate is calcined at 600° C. for a period of 3 to 4 hours. The completed substrate has approximately 9% by weight of the substrate of gamma alumina contained thereon.

The tungsten is next impregnated on the gamma alumina coated substrate using a solution of $H_2WO_4$ in concentrated $NH_4OH$. This solution is dried on the coated substrate at a temperature of 130° C. and then calcined at 300° C. for a time period of 3 to 4 hours. The tungsten is placed by this process onto the substrate in a finely divided manner and makes up approximately 4.75% by weight of the substrate of tungsten.

The palladium is now impregnated onto the substrate using an acidic aqueous solution of palladium chloride (4%/vol. in concentrated $HNO_3$) dried on the substrate at 130° C. and then calcined at 500° C. for a time period of 3 to 4 hours. This results in approximately 0.15% by weight of the substrate of palladium being applied to the substrate in a finely divided state. With the great excess of tungsten available on the substrate, the tungsten is present on the substrate in a quantity such that the tungsten is available to substantially all of the palladium on the support medium.

By having the tungsten closely available to the palladium, we believe the following happens. There is believed to be an interaction between palladium and tungsten resulting in possible $PdWO_x$ type surface complex formulation where x varies from 3 to 2 to 1, depending upon reduction temperature, time of reduction, and reducing gas mixture. The $PdWO_x$ type surface complex has significantly different catalytic properties than either palladium or $WO_3$. Thus, under reducing conditions, such catalyst provides activity for saturated hydrocarbons which is similar to platinum without producing high $NH_3$ formation, a common product of NO reduction under reducing conditions over a Pt catalyst. The weight ratio of W/Pd could vary from 2 to 50, however, in the preferred limit it can very from 5 to 20 times greater amount.

If a $PdWO_x$ complex is presynthesized for deposition on a substrate, then one can deposit this material on the washcoated substrate. In this case, no excess of tungsten over palladium is needed, and tungsten and palladium could be present in equal amounts on an atomic basis.

Although this preferred embodiment illustrated herein was prepared as outlined above, there are a number of ways that a skilled artisan can vary the preparation. For example, instead of impregnating tungsten and gamma alumina in two consecutive steps with calcination therebetween, one can combine these steps in one. Also, the gamma alumina support need not be coated on a honeycomb, but may be in a different configuration such as alumina pellets as required for a desired application.

Reference is now made to FIGS. 1, 2 and 3 so that the benefits of the catalyst system in the method of this invention may be better understood.

In FIG. 1 there is shown the effect of redox ratio on the conversion efficiency for oxides of nitrogen, carbon monoxide and unburned hydrocarbons over a palladium only catalyst on a gamma alumina coated substrate.

This graph indicates that this catalyst normally maintains a respectable conversion efficiency for unburned hydrocarbons and reduction of oxides of nitrogen as the redox potential moves from less than one (fuel deficient) to more than one (fuel excess). However, the significant thing to note about the palladium only catalyst system is that the amount of ammonia produced as a percentage of the oxides of nitrogen reduced is drastically increased as the redox potential moves from 1.0 toward 2.2. The significant amount of ammonia produced is much more than can be tolerated in a such system.

In FIG. 2 there is graphed the effect of the redox ratio on the conversion efficiency for oxides of nitrogen, carbon monoxide and unburned hydrocarbons over a tungsten only catalyst system on a gamma alumina washcoat. This graph indicates that the tungsten only system has almost no conversion efficiency in the reduction of oxides of nitrogen from a redox potential of 0.8 all the way to 2.0. This demonstrates that the tungsten only material has absolutely no efficiency for the conversion of oxides of nitrogen.

In FIG. 3 there is seen the effect of redox ratio on the conversion efficiency for oxides of nitrogen, carbon monoxide and unburned hydrocarbons over a catalyst system containing 0.15% by weight palladium, 4.75% by weight tungsten on a gamma alumina washcoated substrate. This graphical presentation is of interest because it shows that the efficiency of this catalyst remains high for the conversion of hydrocarbons even though one moves into the rich fuel region past a redox potential of 1.0. It also shows that the oxides of nitrogen conversion rate is quite good in the rich region and actually increases as one goes to richer stoichiometric mixtures. The thing of particular importance with this catalyst system is that the ammonia produced as a percentage of the oxides of nitrogen converted remains very low and in some regions is nonexistant. For example, no ammonia is seen until a redox potential in excess of 1.4 is passed for this catalyst system and even at a redox potential greater than 1.8, the amount of ammonia produced as a percentage of the oxides of nitrogen converted is a relatively low 10% when compared to approximately 55% at the same point for the palladium only catalyst system shown in FIG. 1.

This low ammonia production is a significant improvement because tungsten was added to palladium. The real interesting point is that tungsten by itself had no apparent activity for the reduction of oxides of nitrogen, but yet when this material is associated with a palladium catalyst, the uniquely beneficial results are achieved of permitting a significant conversion of oxides of nitrogen by the palladium/tungsten catalyst, yet the great suppression and control of the amount of ammonia produced as a result of this conversion.

Another significant aspect of the use of the palladium/tungsten catalyst system will be understood after review of the material contained in Table 1 hereinbelow.

TABLE 1

| | HYDROCARBON CONVERSIONS BY CATALYSTS OF FIGS. 1, 2 & 3 | | | | | |
|---|---|---|---|---|---|---|
| | CATALYST | | | | | |
| | Pd | | W | | Pd-W | |
| R | $C_3H_6$ | $C_3H_8$ | $C_3H_6$ | $C_3H_8$ | $C_3H_6$ | $C_3H_8$ |
| 1.0 | 100% | 58% | 76% | 0 | 100% | 88% |
| 1.1 | 100% | 42% | 76% | 0 | 100% | 85% |
| 1.2 | 100% | 35% | 73% | 0 | 100% | 80% |

TABLE 1-continued

| | HYDROCARBON CONVERSIONS BY CATALYSTS OF FIGS. 1, 2 & 3 | | | | | |
|---|---|---|---|---|---|---|
| | CATALYST | | | | | |
| | Pd | | W | | Pd-W | |
| R | $C_3H_6$ | $C_3H_8$ | $C_3H_6$ | $C_3H_8$ | $C_3H_6$ | $C_3H_8$ |
| 1.3 | 100% | 27% | 67% | 0 | 100% | 76% |
| 1.4 | 100% | 23% | 64% | 0 | 100% | 70% |
| 1.5 | 100% | 20% | 58% | 0 | 100% | 67% |
| 1.6 | 100% | 18% | 52% | 0 | 100% | 64% |
| 1.7 | 100% | 17% | 47% | 0 | 100% | 61% |
| 1.8 | 100% | 15% | 41% | 0 | 100% | 58% |

The unique feature of using the catalyst system as demonstrated in Table 1 is that use of our catalyst system allows conversion of difficult to oxidize, saturated unburned hydrocarbons under oxygen deficient conditions and simultaneously provides some oxides of nitrogen conversion with minimum ammonia formation as demonstrated in FIG. 3. For example, Table 1 shows that while a palladium only catalyst retains its efficiency in oxidizing $C_3H_6$, its ability to oxidize $C_3H_8$ drops off as R goes up from 1.0 to 1.8. At 1.8, its efficiency in this conversion is only 15%. Table 1 also shows that tungsten has absolutely no ability in converting $C_3H_8$ in the range of R's from 1.0 to 1.8. The amazing point now is that when palladium and tungsten are used together, the conversion efficiency for $C_3H_8$ is drastically increased at an R of 1.0 and remains drastically increased over any conversion efficiency achieved on a palladium only catalyst regardless of the redox potential at which the measurement is made. This effect is more than additive because the tungsten by itself has no efficiency in the oxidation of $C_3H_8$, but when it is combined with palladium the overall efficiency of the palladium for this conversion is greatly enhanced.

In summation, we desire to point out some of the characteristics of the palladium/tungsten catalyst used with our method. Under reducing conditions, for example, with the redox potential equal to 1.8, the catalyst system converts 45% of the gross oxide of nitrogen and 41% of the net oxides of nitrogen. At this location, the ammonia formation measured as a percentage of the oxides of nitrogen converted is only 10%. From this measurement and the other data displayed in FIG. 3, the following may be stated. In a vehicle application where an engine is operating slightly lean of stoichiometry, the palladium/tungsten containing catalyst used with the method of our invention will give high unburned hydrocarbons and carbon monoxide conversion. For example, at R=0.9 the unburned hydrocarbon and carbon monoxide conversions are approximately 96% and 80%, respectively. During rich transients (for example, during an acceleration when more power is demanded) the engine will run rich, that is, the air/fuel ratio decreases from the set point of 15.2–15.5 to approximately 14.3 (e.g., R=1.8). Under these conditions, the palladium/tungsten catalyst system used with the method of our invention can convert approximately 40% of the oxides of nitrogen to nitrogen gas with a minimum ammonia formation. It should also be noted that even under such reducing conditions the catalyst system used with the method of our invention is capable of converting over 85% of the total unburned hydrocarbons.

It is understood that many different materials may find their way onto a catalyst substrate for particular use. For example, certain materials are put on the catalyst substrate in order to stabilize the gamma alumina catalyst washcoat. Also, other washcoat materials such as zirconia or alpha alumina may be used and these also may have their stabilizing elements. As an additional matter, stabilizing elements may be present for stabilizing the catalyst materials under certain operating conditions, for example, under oxidizing or under reducing conditions. In a similar manner, materials may also find their way onto the catalyst substrate in order to promote the catalyst activity or to ensure the action of a stabilizer material. The appended claims are not to be constructed so as to eliminate such materials from the catalyst system used with the method of our invention. Our predominent invention is that the combination of palladium and tungsten has certain unique benefits. It is well within the scope of a skilled artisan to use the unique benefits of this catalyst system with other catalyst materials, promoters and stabilizers therefor. Thus, the appended claims are to be interpreted as not excluding from their coverage the use of catalyst systems which use palladium and tungsten in the manner described in this specification, but use such materials in combination with other catalyst elements as well as promoters and stabilizers therefor.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

What is claimed is:

1. In a process for treatment of exhaust gases from an internal combustion engine the steps of:
   burning a hydrocarbon fuel or a fuel containing hydrocarbons and alcohol blends in the internal combustion engine thereby to generate exhaust gases from the internal combustion engine containing various amounts of unburned hydrocarbons, carbon monoxide and oxides of nitrogen depending upon operating conditions of the internal combustion engine; and
   passing said generated exhaust gases over an improved catalyst composition in which a support medium for supporting a catalyst system had deposits thereon consisting essentially of:
   palladium; and
   finely divided tungsten, said tungsten being present on said support medium in quantities such that tungsten is available to substantially all of said palladium on the support medium so that said palladium/tungsten combination is effective in the catalytic oxidation of unburned hydrocarbons and carbon monoxide and the catalytic reduction of oxides of nitrogen without significant production of ammonia when the internal combustion engine is operating under fuel rich conditions.

2. In a process for treatment of exhaust gases from an internal combustion engine the steps of:
   burning a hydrocarbon fuel or a fuel containing hydrocarbons and alcohol blends in the internal combustion engine thereby to generate exhaust gases from the internal combustion engine containing various amounts of unburned hydrocarbons, carbon monoxide and oxides of nitrogen depending upon operating conditions of the internal combustion engine; and
   passing said generated exhaust gases over an improved catalyst composition in which a support medium for supporting a catalyst system had deposits thereon consisting essentially of:
   finely divided palladium; and
   finely divided tungsten, said tungsten being present on the said catalyst support medium in a quantity such that tungsten is available to substantially all of said finely divided palladium on the catalyst support medium so that said palladium/tungsten combination is particularly effective in the catalytic oxidation of unburned hydrocarbons and carbon monoxide and the catalytic reduction of oxides of nitrogen without significant production of ammonia when the internal combustion engine is operating under fuel rich conditions.

3. The process of claim 1 or claim 2, in which the support media is a gamma alumina coated monolithic substrate.

4. The process of claim 1 or claim 2, in which the support media is gamma alumina pellets.

5. The process of claim 1 or claim 2, in which the support media is a washcoated metallic substrate.

6. In a process for treatment of exhaust gases from an internal combustion engine the steps of:
   burning a hydrocarbon fuel or a fuel containing hydrocarbons and alcohol blends in the internal combustion engine thereby to generate exhaust gases from the internal combustion engine containing various amounts of unburned hydrocarbons, carbon monoxide, and oxides of nitrogen depending upon operating conditions of the internal combustion engine; and
   passing said generated exhaust gases over an improved catalyst composition in which a support medium for supporting a catalyst system had deposits thereon consisting essentially of:
   0.02 to 1.0% by weight of the substrate of finely divided palladium; and
   from 2 to 50 times the weight of palladium present of finely divided tungsten, said tungsten being present on the said catalyst support medium in a quantity such that tungsten is available to substantially all of said finely divided palladium on the catalyst support medium so that said palladium/tungsten combination is particularly effective in the catalytic oxidation of unburned hydrocarbons and carbon monoxide and the catalytic reduction of oxides of nitrogen without significant production of ammonia when the internal combustion engine is operating under fuel rich conditions.

7. The process of claim 6, in which the support media is a gamma alumina coated monolithic substrate.

8. The process of claim 6, in which the support media is gamma alumina pellets.

9. The process of claim 6, in which the support media is a washcoated metallic substrate.

10. The process of claim 6, in which said finely divided tungsten is present from 5 to 20 times the weight of palladium present.

11. In a process for treatment of exhaust gases from an internal combustion engine the steps of:
    burning a hydrocarbon fuel or a fuel containing hydrocarbons and alcohol blends in the internal combustion engine thereby to generate exhaust gases from the internal combustion engine containing various amounts of unburned hydrocarbons, carbon monoxide, and oxides of nitrogen depending upon operating conditions of the internal combustion engine; and passing said generated exhaust gases over an improved catalyst composition in which a support medium for supporting a catalyst system had deposits thereon consisting essentially of:

a presynthesized $PdWO_x$ (x goes from 1 to 3), said presynthesized palladium/tungsten compound being effective in the catalytic oxidation of unburned hydrocarbons and carbon monoxide and the catalytic reduction of oxides of nitrogen without significant production of ammonia when the internal combustion engine is operating under fuel rich conditions.

12. The process of claim 11, in which the support media is a gamma alumina coated monolithic substrate.

13. The process of claim 11, in which the support media is gamma alumina pellets.

14. The process of claim 11, in which the support media is a washcoated metallic substrate.

* * * * *